(12) United States Patent
Friedman et al.

(10) Patent No.: US 6,865,692 B2
(45) Date of Patent: Mar. 8, 2005

(54) ENTERPRISE TEST SYSTEM HAVING PROGRAM FLOW RECORDING AND PLAYBACK

(75) Inventors: George E. Friedman, Framingham, MA (US); Michael V. Glik, Newton, MA (US)

(73) Assignee: Empirix Inc., Bedford, MA (US)

( * ) Notice: Subject to any disclaimer, the term of this patent is extended or adjusted under 35 U.S.C. 154(b) by 627 days.

(21) Appl. No.: 09/873,605

(22) Filed: Jun. 4, 2001

(65) Prior Publication Data

US 2002/0053043 A1 May 2, 2002

Related U.S. Application Data

(60) Provisional application No. 60/243,944, filed on Oct. 27, 2000.

(51) Int. Cl.$^7$ .................................. G06F 11/00
(52) U.S. Cl. .................. 714/25; 714/45; 714/46; 714/47; 714/48; 717/128; 717/129
(58) Field of Search ................. 714/25, 45–48; 717/128, 129

(56) References Cited

U.S. PATENT DOCUMENTS

| | | | |
|---|---|---|---|
| 5,121,497 A | * 6/1992 | Kerr et al. | 719/328 |
| 5,157,782 A | * 10/1992 | Tuttle et al. | 714/45 |
| 5,809,238 A | * 9/1998 | Greenblatt et al. | 709/202 |
| 5,987,250 A | * 11/1999 | Subrahmanyam | 717/130 |
| 6,002,871 A | * 12/1999 | Duggan et al. | 717/135 |
| 6,311,327 B1 | * 10/2001 | O'Brien et al. | 717/114 |
| 6,321,263 B1 | * 11/2001 | Luzzi et al. | 709/224 |
| 6,587,969 B1 | * 7/2003 | Weinberg et al. | 714/46 |

OTHER PUBLICATIONS

Internet, http://java.sun.com/products/jdk/1.1/docs/guide/reflection; "Reflection" 1996–1998 Sun Microsystems, Inc., pp. 1–8.

Internet, http://java.sun.com/products/jdk/1.1/docs/guide/reflection/spec/java–reflection.docl.html; "The class java.lang.Class" pp. 1–9.

Internet, http://java.sun.com/docs/books/tutorial/reflect/index.html, "Trail: The Reflection API" by Dale Green, pp. 1–2.

Internet, http://java.sun.com/products/jdk/1.1/docs/guide/reflection/faq/faq/html, "Reflection Frequently Asked Questions", The Source For Java™ Technology, pp. 1–2.

\* cited by examiner

Primary Examiner—Robert Beausoliel
Assistant Examiner—Emerson Puente
(74) Attorney, Agent, or Firm—Chaptin & Huang, L.L.C.; David W. Rouille, Esq.

(57) ABSTRACT

An enterprise test system includes a plurality of probes inserted at various locations in the enterprise system for recording data from system components during teach mode. During playback mode, the recorded data is used to exercise the system as probes collect actual data for comparison to expected data. In one embodiment, data from actual user transactions is recorded by the probes. The recorded data can be expanded to load test a component using recorded transaction data. In one embodiment, the recorded data can be used to load test a component under test without compiling test code.

29 Claims, 8 Drawing Sheets

ENTERPRISE TEST SYSTEM HAVING PROGRAM FLOW RECORDING AND PLAYBACK

CROSS REFERENCE TO RELATED APPLICATIONS

The present application claims the benefit of U.S. Provisional Patent Application No. 60/243,944, filed on Oct. 27, 2000, which is incorporated herein by reference.

STATEMENT REGARDING FEDERALLY SPONSORED RESEARCH

Not Applicable.

FIELD OF THE INVENTION

The present invention relates generally to distributed computer systems and, more particularly, to enterprise application systems.

BACKGROUND OF THE INVENTION

As is known in the art, distributed computing has been used for many years. More recently, distributed computing has been used in "enterprise-wide" applications. An enterprise-wide application is an application that allows a relatively large group of people to work together on a common task. For example, bank employees at each bank branch must be able to access a database of accounts for the bank customers. Enterprise-wide applications can also include Internet-based electronic commerce, such as web sites from which users can purchase good and services.

As available hardware and software components have evolved, the architecture of enterprise wide applications has changed. One known architecture is referred to as an N-tier enterprise model. The most prevalent N-tier enterprise model is a three tier model, which includes a front end, middleware and a back end. Typically, the back end corresponds to a database, the front end provides a client interface, such as a Graphical User Interface (GUI), and the middleware includes software for managing interactions with the database, e.g., the "business logic."

The middleware generally resides on a computer called a server. A back end database can be located on the same computer or on a different computer. The GUI to the enterprise system is usually on the remote personal computer of a user. The computers are connected together through a network. Because many people use the enterprise wide application, these systems must enable simultaneous users such that there are many clients connected to a single server. Often, many clients will be connected to the server simultaneously.

Those familiar with Internet commerce will recognize that the N-tiered model also describes many Internet web sites that sell goods or services. For example, a web site that auctions cars is likely to fit the N-tiered model. In such an application, databases are provided to track buyers, sellers, and objects being auctioned. The application can also include a database for tracking bids as they are entered. The middleware provides access to the databases and encapsulates the business logic around the transactions, such as when to accept a bid, when to declare an item sold, etc. In the world of distributed computing, it makes no difference whether the clients using the application are employees of a single company or are Internet users located throughout the world.

In the N-tiered model, the middleware is typically componentized in accordance with a known component standard for easy integration with software at the other tiers. Enterprise JavaBeans (EJB) by Sun Microsystems, Component Object Model (COM), Distributed Component Object Model (DCOM), COM+, and Common Object Request Broker Architecture (CORBA), are examples of component specification standards that are commercially available.

EJBs are written in the JAVA programming language, which provides "platform independence." Platform independent means that an application is intended to perform the same regardless of the hardware and operating system on which it is operating. Platform independence is achieved through the use of a "container." A container is software that is designed for a specific platform. It provides a standardized environment that ensures the application written in the platform independent language operates correctly. The container is usually commercially available software and the application developer will buy the container rather than create it.

Functional testing of enterprise applications, including middleware, is well known to one of ordinary skill in the art. While functional testing can provide some indication that an application will operate as intended, it is generally not until the application is deployed into its actual operating environment that the performance of the application under load is known. Thus, a significant problem facing an application developer is generating tests for exercising the application under expected load conditions. For example, it would be useful for an application developer to know how many simultaneous users a middleware application can accommodate given a specified transaction response time. It would further be desirable to identify objects in the application, given real world load conditions, causing transaction bottlenecks.

Another challenge for testing distributed computing systems occurs when the system includes new and legacy enterprise computing environments. As the networks of diverse systems increase in size, the systems become increasingly difficult to test. One testing difficulty results from inter-operating components based on various technologies. For example, legacy mainframe systems can communicate with a server that feeds agents in call centers, web users communicate with browsers, and client/server users communicate with large graphical user interfaces (GUI) based applications. Testing each component in such an enterprise system requires an understanding of the various host operating systems, the wire protocols, and the client/server technologies. The enormity of testing such systems will be readily appreciated by one or ordinary skill in the art.

A further difficulty associated with testing enterprise systems is due to the relatively large number and size of business object properties. For example, business objects that model an insurance application can contain thousands of data items having various types. In order to test these objects, the test system must be aware of the content of these objects in the context of the enterprise application. For example, transaction-based system components interact with each other in a particular way and methods are called in a given order. When buying a book, illustrative EJB components can include ordering, updating inventory, warehouse pick-ordering, updating the ledger, and shipping the item. Each of these components is initiated in a particular order. And within each EJB, the associated methods are called in a specified order. In addition, in the case where a transaction is not completed each component must be informed so as to eliminate the terminated transaction. The context can further include sessions with legacy systems and the like.

In known systems, component level testing requires that the user identify the ordering of components for a transaction and manually order the component methods. In addition, the user must identify other context items that the component under test expects when invoked. One of ordinary skill in the art will readily appreciate the required level of expertise and effort required to set up the context for testing components of an enterprise system. In addition, conventional test systems require a user to manually generate large amounts of data for load testing at the component level. Further, the scope of deployment may be international so as to require testing applications in multi-language environments and multiple time zones.

While known test systems can provide some level of unit testing individual components in a static environment, such systems do not test the system under conditions similar to those under which the enterprise system will actually operate. For example, a test can statically test certain networked components, such as web servers, servlets, application servers, EJBs, message Queues, backend systems, e.g., relational and object data stores, and application specific entities, e.g., call center systems, legacy systems, etc. However, such testing does not exercise an enterprise system so as to examine component operations resulting from users conducting actual transactions, for example.

It would, therefore, be desirable to provide a mechanism for testing an enterprise system under conditions similar to actual operation. It would further be desirable to load test enterprise system components using actual transaction data.

SUMMARY OF THE INVENTION

The present invention provides an architecture for testing enterprise systems that exercises an application under test, inserts probes at various sites in the enterprise network, and records data at the probes for subsequent playback of the recorded data. With this arrangement, an enterprise system can be exercised using data recorded from actual transactions under conditions relatively close to those expected in the operational environment. In addition, the application can be exercised with the recorded data until reaching a selected break point at which a selected component under test can be load tested with data generated from the recorded data. While the invention is primarily shown and described in conjunction with enterprise systems, it is understood that the invention is applicable to distributed systems in general in which it is desirable to comprehensively test system functionality and components.

In one aspect of the invention, a test system for an enterprise system includes an aggregator for communicating with an application under test that can form a part of an enterprise application system. The test system can insert a plurality of probes between the aggregator and various components of the application under test. A signal generator/database is coupled to the probes via the aggregator for storing data recorded by the probes during teach mode and retrieving the recorded data during playback mode. During playback mode, the user can select a breakpoint corresponding to a given component, such as a web page or EJB. Data corresponding to the component can be expanded from the recorded data for load testing the component. For example, a thousand instances of the web page under test can be created and exercised by data expanded from the recorded data associated with the web page. A spread sheet can be created and populated with data to load test the web pages.

In a further aspect of the invention, a method for testing enterprise systems includes inserting probes at various locations in the enterprise system, recording data at the probes during operation of the enterprise system, and retrieving the recorded data during playback mode. The method can further include operating the enterprise system to a selected breakpoint and exercising a component under test with the recorded data. In one embodiment, a plurality of instances of the component under test, such as an EJB, is created and exercised with data expanded from the recorded data for load testing the component under test. Actual and expected data can be compared to identify operational errors.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
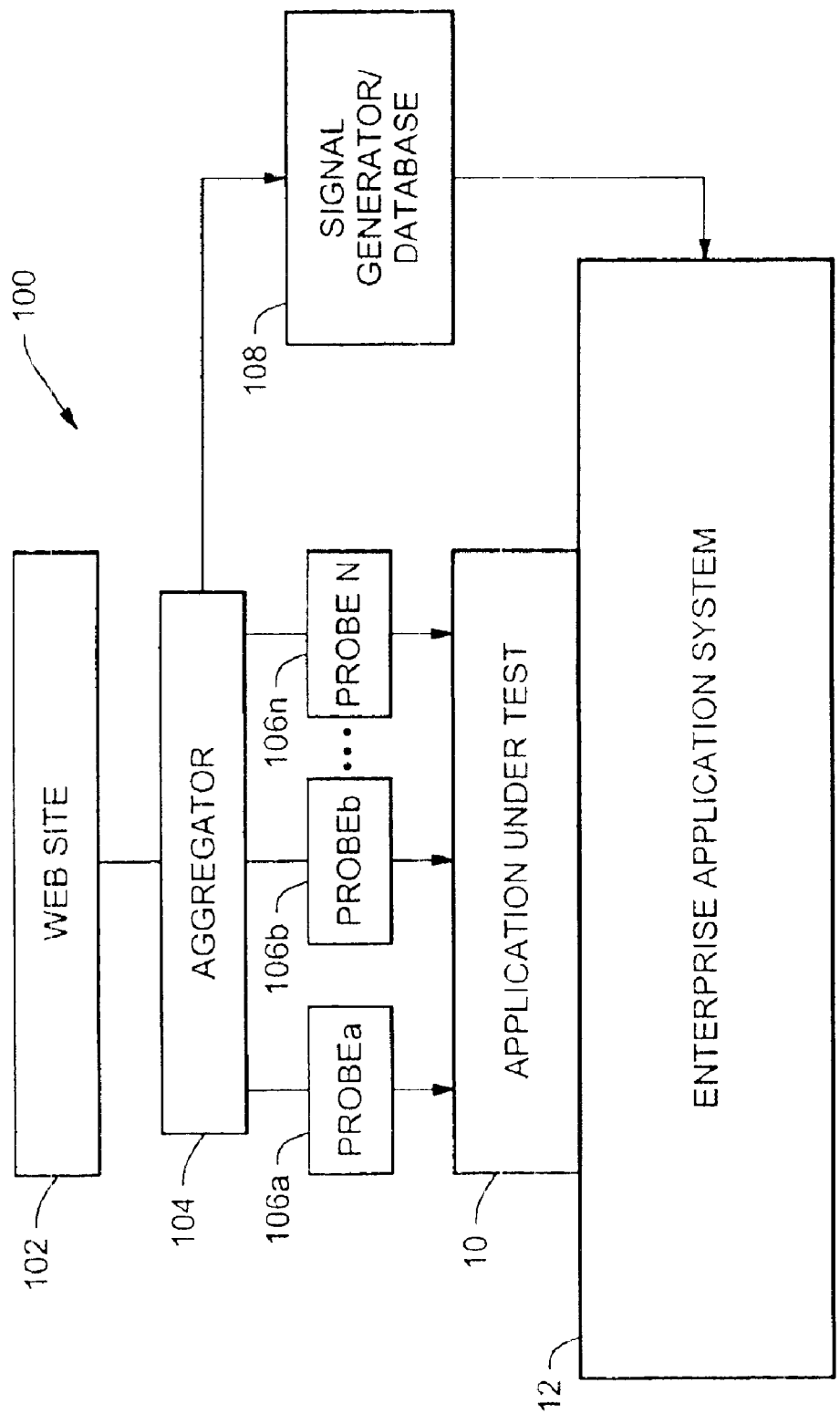
FIG. 1 is a top level block diagram of a system testing enterprise systems by recording data via inserted probes in accordance with the present invention.

FIG. 1 shows an exemplary enterprise test system 100 having program flow recording and playback in accordance with the present invention. A user interface 102, such as a web site, is connected to an aggregator 104, which can be provided as a web server for communicating with an application under test (AUT) 10. A series of probes 106,$a$-N, which are processes that run in an enterprise application system as described below, are located between the aggregator 104 and the application under test 10. It is understood that the application under test 10 operates as part of the enterprise application system 12. A signal generator/database 108 is coupled between the aggregator 104 and the enterprise application system 12.

As described more fully below, the probes 106$a$-N include a sensing end in the form of technology specific test engine for collecting and passing information to the aggregator. The information can include test data, test scripts, test status, test results, and the like. The test engine examines the environment to determine whether test responses are present based upon scripts and data from the probe. Each probe has a script for gathering data that is specific to the technology of the location at which the probe is inserted.

It is understood that the location and type of probe can vary. The inserted probes, which include technology specific test engines, can determine whether data arrived, whether the correct data arrived, and how long it took. Exemplary probes include browser probes to test whether data made it from the web server to the browser. For example, a test engine portion of the probe can query the browser to determine whether the data arrived in the browser's document object model. Web server probes can determined whether the data made it from a specific source to the web server. The probe test engine must be able to filter the data coming in and/or hook the scripts handling the data to determine if the data arrived. Network Application component probes can interface with hardware/software application systems that perform a function in the network. In testing whether the data made it from a specific source to the network application component, the probe test engine queries the component using a vendor supplied API. Application Server components probes can test whether the data made it from a specific source to the application server. The probe test engine can hook the server proxy and filter the data to ask if the data arrived. Application GUI probes can test whether data made it from the server to the client application. The probe test engine can query the GUI system to determine whether the data arrived in the GUI's component model. Database probes can determine whether data made it to a data table. The database probe can instruct the site to query the data and compare it to known data (test mode) or send the data back to the aggregator (teach mode). Networks probes can filter data and query the network to determine whether the data arrived. RMI/CORBA/DCOM stubs probes can test whether data made it from a specific skeleton to an application proxy stub. The probe test engine can hook the server proxy and filter the data to ask if the data arrived. Further probe types and locations will be readily apparent to one of ordinary skill in the art.

Figure 2:
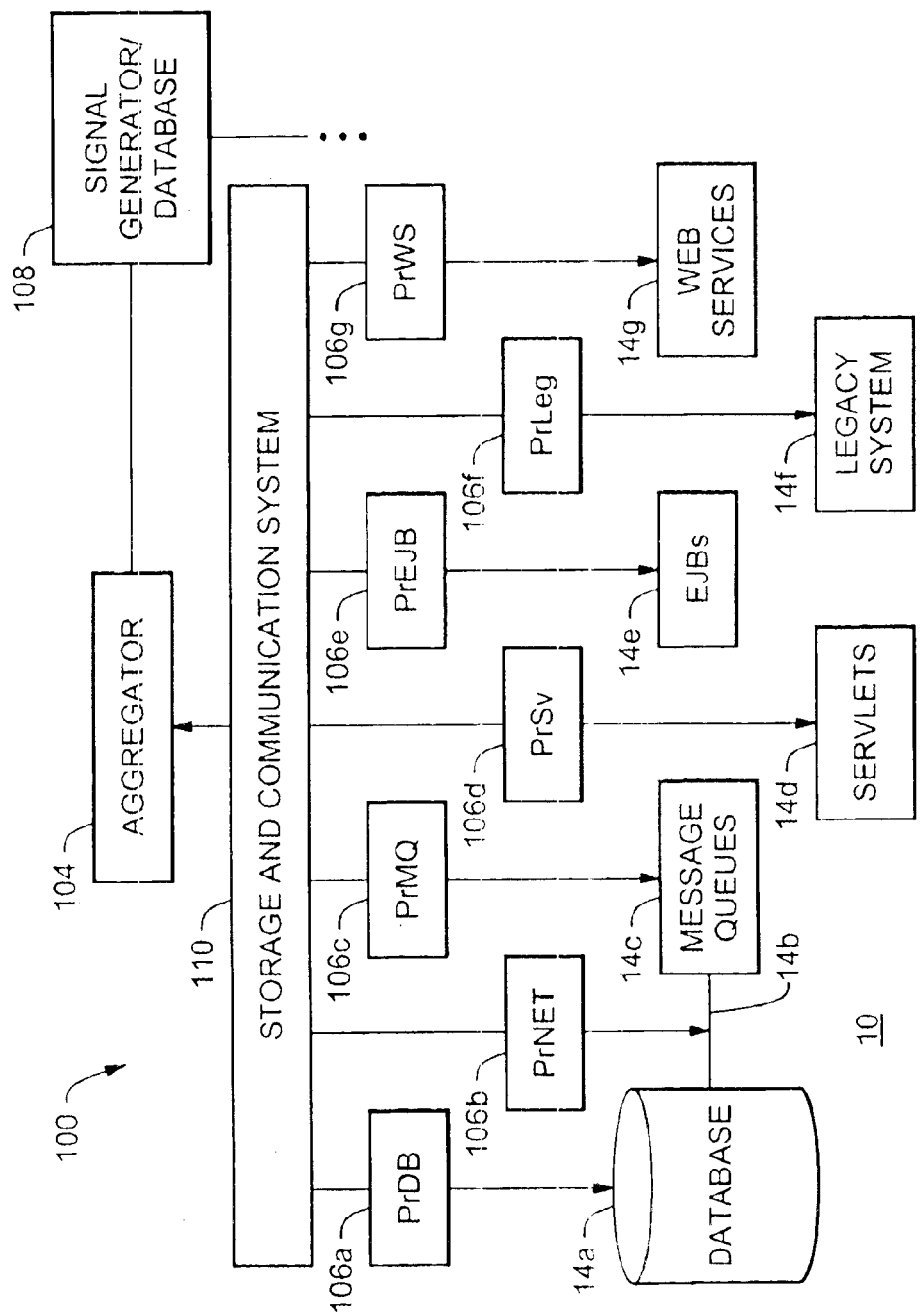
FIG. 2 is a block diagram showing further details of the probes of FIG. 1.

FIG. 2 shows further details of an exemplary configuration for the probes 106 of FIG. 1 in which like reference numbers indicate like elements. The application under test 10 includes a plurality of components including a database 14a, a network 14b, message queues 14c, servlets 14d, enterprise java beans (EJBS) 14e, a legacy system 14f, and a set of web services 14g. Each of these components 14 communicates with an exemplary storage and communication system 110, which is connected to the aggregator 104. The probes 106 are insertably coupled to each of the components 104. More particularly, a database probe 106a is connected to the database 14a, a network probe 106b is connected to the network 14b, a message queue probe 106c is connected to the message queue component 14c, a servlet probe 106d is coupled to the servlet component 14d, an EJB probe 106e is coupled to the EJB components 14e, a legacy probe 106f is connected to the legacy system 14f, and a web services probe 106g is connected to the web server component 106g. It will be appreciated that each probe 106 is technology specific so as to collect data in the form in which the corresponding component communicates. It is understood that further probe locations, network connections, and components will be readily apparent to one of ordinary skill in the art based upon the requirements of a particular application.

In an exemplary embodiment, the aggregator 104 provides a graphical interface, such as a web page, for the user that displays probes 106 that can be inserted into the application under test 10, as well as the signal generator/database 108 to provide a picture of the application from a transactional view. For each major transaction in the system, there is a picture of the software/hardware components. The display can indicate possible locations in which probes 106 can be inserted for enabling the user to activate probe sites, inject probes, and select tests for execution. The test inputs are driven from a test plan through the signal generator/database 108, as described more fully below. The expected results at each probe are aggregated and displayed for the user upon test completion. Analysis is performed and the web page can updated to show the results of the tests across the enterprise. Each component can be displayed with a variety of result indicators, such as relative times and pass/fail flags. Further testing resolution can provide test results for each method, and complex object. Graphical displays including web pages for providing the described information are well known to one of ordinary skill in the art.

It is understood by those skilled in the art that enterprise storage applications are based upon data being saved as units of work. In general, the work units are either all saved or none are saved. Testing the application under test can determine whether a transaction completes, how long it takes to complete, and how many successful transactions may be completed per unit of time. A transaction may be composed of many layers of software components. For example, transaction can be initiated in a servlet, be processed through many EJBs, end up on a message queue, process data from a database and/or other EJBs, and return data to the servlet. The testing system should follow the transaction through each software layer and component in the enterprise application. The transaction numbers, input and output objects, elapsed time and success or failure can be recorded by the probes to enable component testing in the context of application data.

Further details of testing and analyzing enterprise systems are described in U.S. patent application Ser. No. 09/638,828 filed on Aug. 14, 2000, and Ser. No. 09/548,203, filed on Apr. 13, 2000, which are incorporated herein by reference.

Figure 3:
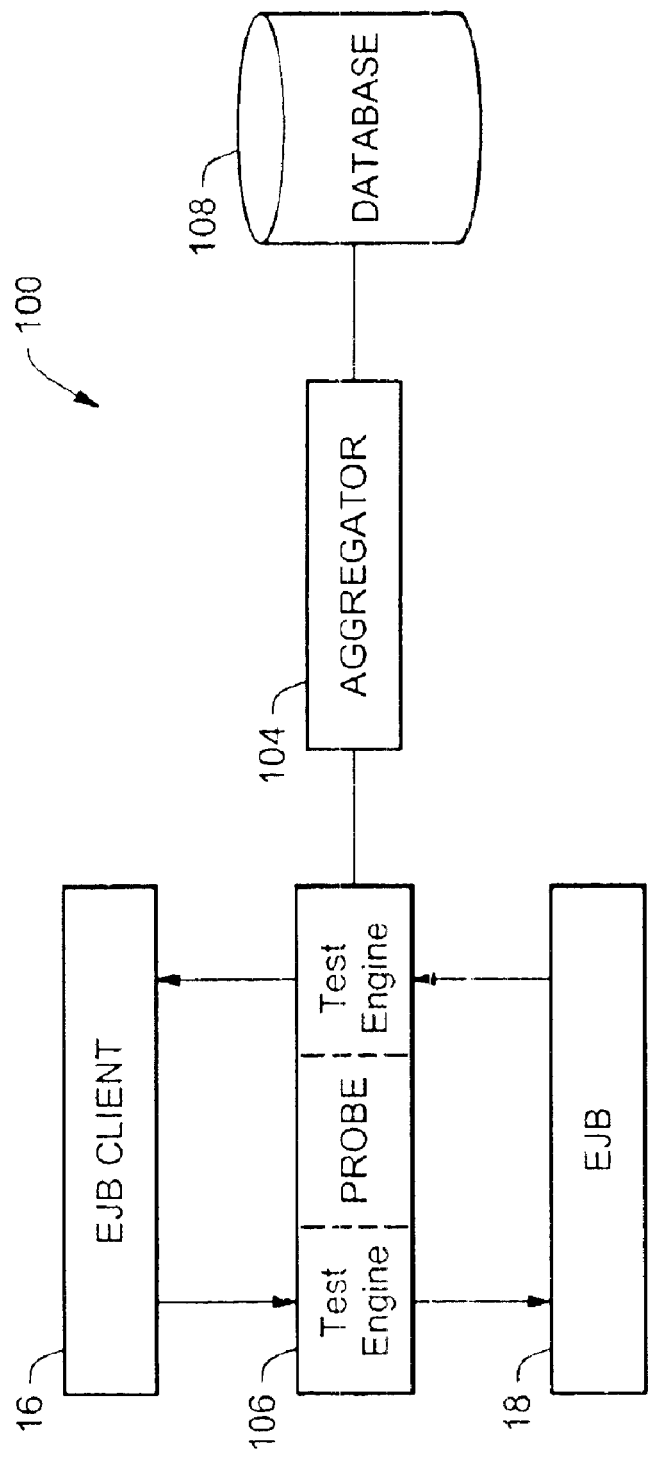
FIG. 3 is a schematic depiction of a probe inserted between an EJB client and an EJB during teach mode in accordance with the present invention.

FIG. 3 shows further details of an EJB probe 106 as part of an enterprise test system 100 in accordance with the present invention. The EJB probe 106 communicates with an EJB client 16 and the EJB 18. It is understood that the EJB client 16 corresponds to the signal generator 108 during teach mode as data is logged in the database. A database 108 for recording component methods and data can be coupled to the probe for storing log data from the probe, as described more fully below.

Using Java reflection technology, the test engine portion of the probe 106 learns the characteristics of the EJB 18, builds a bean mimicking the EJB 18, and inserts the created "hot deployed" bean (the probe 106) between the EJB client 16 and the EJB 18. For each deployed EJB 18, the test engine of the probe 106 produces an equivalent "hot deployed" recorder EJB probe. More particularly, the EJB 18 is copied and decomposed, a new bean implementation is created, the user bean deployment descriptors are changed, and the bean is recreated. Before the user runs the application in playback mode with recorded data, the recorder bean, i.e., the probe 106, is hot deployed, and the name space proxy is switched, as described below. During the teach mode, each probe test engine passes the logged data back to the aggregator 104 for storage in the database 108.

Figure 4:
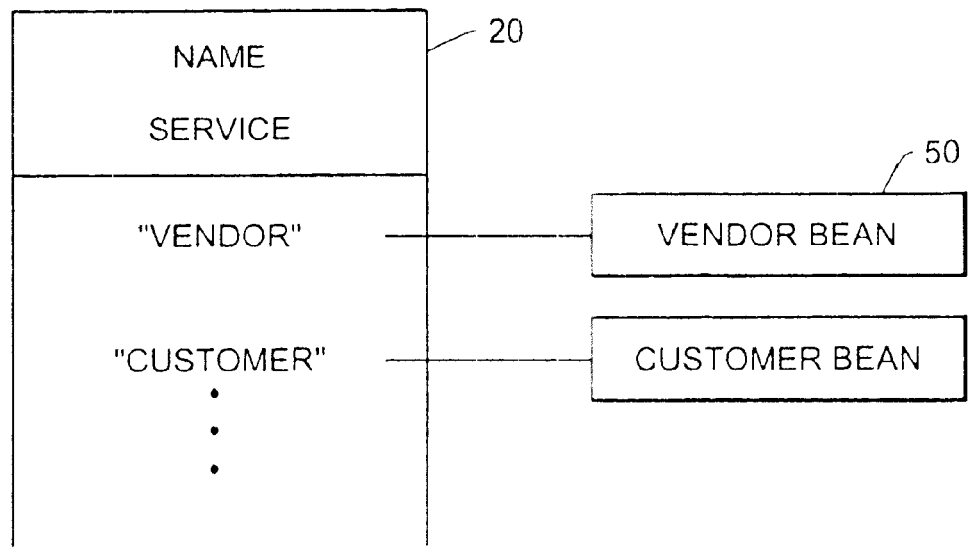
FIG. 4 is a pictorial representation of how the probe is inserted by modifying the system name service in accordance with the present invention.
Figure 4:
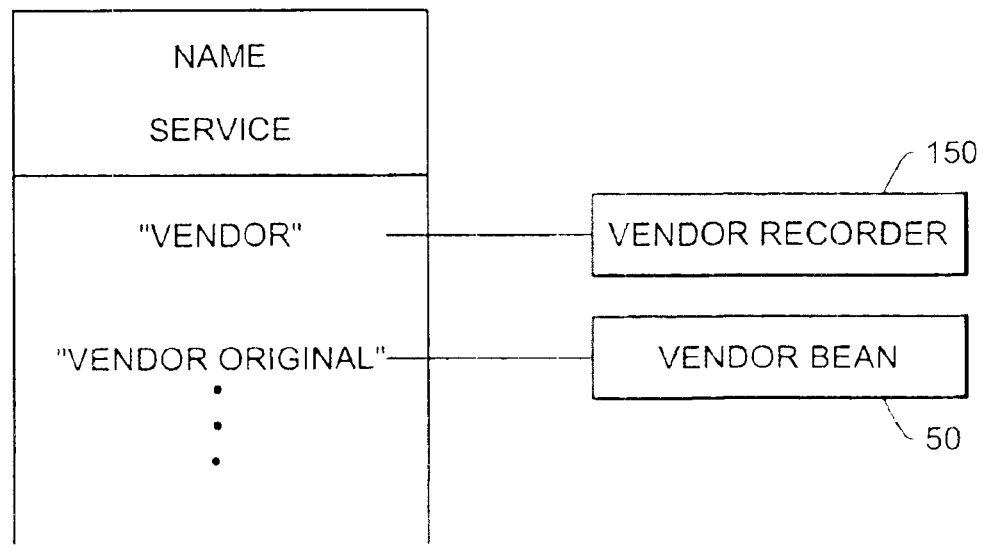

As shown in FIG. 4, for example, the recorder EJB, i.e., the probe 106 (FIG. 3), inserts itself by replacing the user proxy in the distributed system name space with the recorder proxy via the name service 20. The user EJB proxy is renamed so that the recorder bean now calls the original bean. As shown in the illustrated embodiment for example, a call to the user vendor bean 50 named "vendor" is redirected to the vendor recorder bean 150, i.e., the probe, which was created from the original vendor bean using reflection. The original bean 50 is then called by "vendor original," for example. The corresponding recorder vendor bean 150 is called for each method that would have been called in the user bean 50. The recorder bean 150, i.e., the probe, places the input objects, output objects, transaction numbers, elapsed time, and method data into the database 108 (FIG. 3) during teach mode.

As is well known to one of ordinary skill in the art, reflection enables Java code to discover and use information about the fields, methods, and constructors of loaded classes. In general, the EJB client 16 (FIG. 3) is unaware that the probe exists since the probe operates transparently while recording data to the database. That is, the EJB client "thinks" it is communicating with the EJB while the inserted probe transparently records data.

Figure 5:
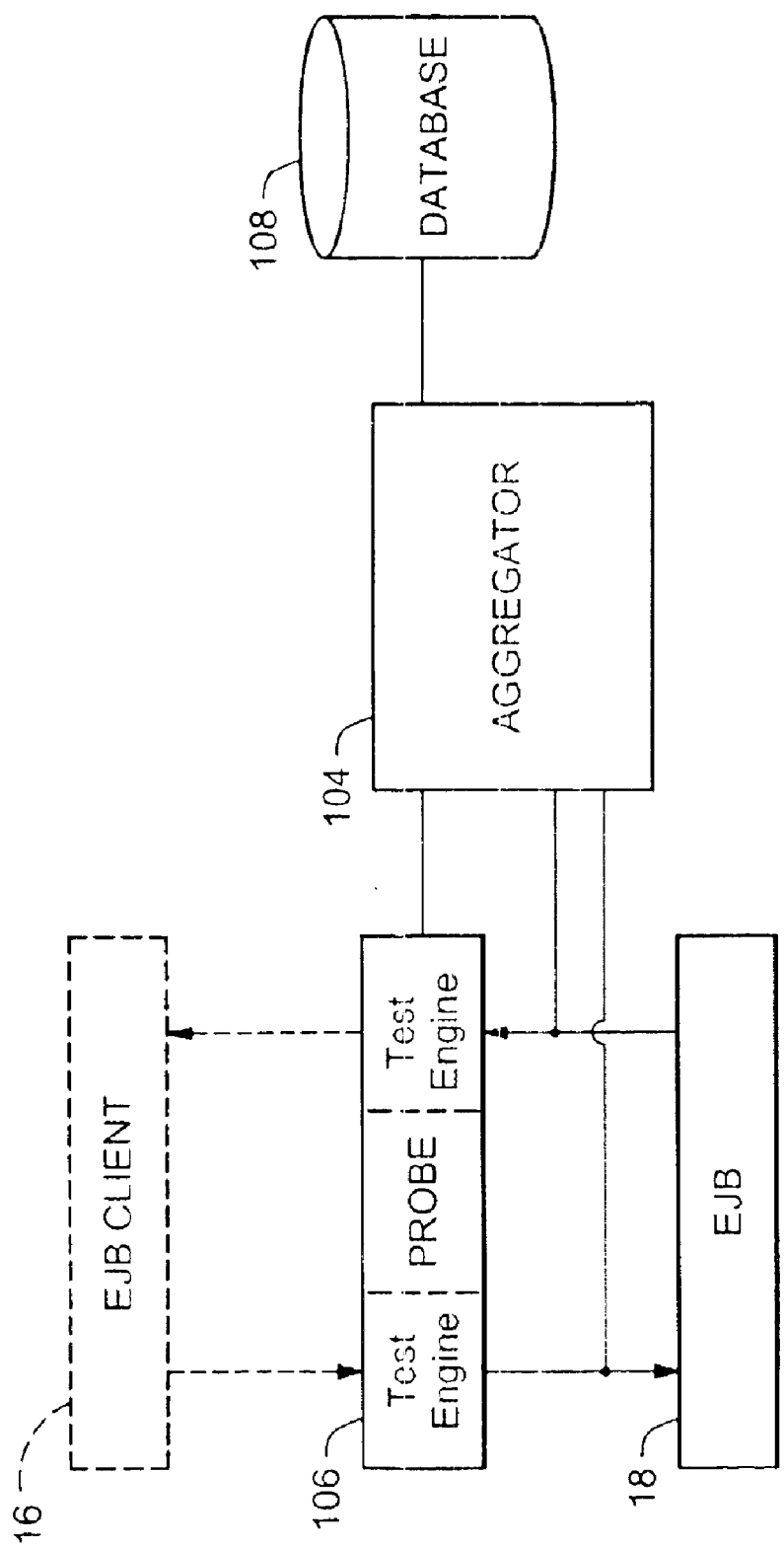
FIG. 5 is a schematic depiction of the probe of FIG. 3 during playback mode in accordance with the present invention.

As shown in FIG. 5, in the playback mode, the aggregator 106 provides the recorded data from the database 108 to the component under test, i.e., the EJB 18, instead of the EJB client 16. The aggregator 104 programs the probe 106 with the test data from the database 108 and runs the test engines of the probe 106. The probe 106 retrieves responses from the test engine and passes the information to the aggregator 104, which stores the data in the database 108. The aggregator 104 can log and/or display the status of each probe 106 for system error analysis. For example, expected and actual data in the database 108 can be compared to identify errors.

In general, EJBs provide a transactional model for enterprise applications. The EJB test engine objective is to record transactions occurring in the EJB. Recorded transaction information can include transaction number, input data, output data, and elapsed time for each EJB method. In one embodiment, there is one recorder bean for each deployed EJB of interest.

It is understood that when recording transaction times for the EJB test engine, it is important to be able to calculate out the time in the recorder to determined the actual time spent. In one embodiment, the accumulated recorded elapsed time for each method is obtained. The percentage of time each recorder method takes is calculated and reused to report on user times. When multi-level recording is performed, the elapsed time in each method is captured. The elapsed time information can be displayed in a call graph to find the actual user time for each leaf method for calculating user times as the transaction tree is traversed. In this way, the percentage of time taken for the user at each node can be calculated and stored. The percentages are a function of the recorder and can be reused from a database. If a test case includes some alternate application or database configuration, the percentages are repeatable.

In an exemplary embodiment, the database 108 records the order in which methods are called for each transaction. These method sequences can be used in conjunction with automatically generated code, for example, to insure the methods are called in the correct order. The database 108 records the input and output objects used in each method that is called for each transaction. These complex objects, may be used in conjunction with automatically generated applications to ensure that the data context is correct during testing.

Figure 6:
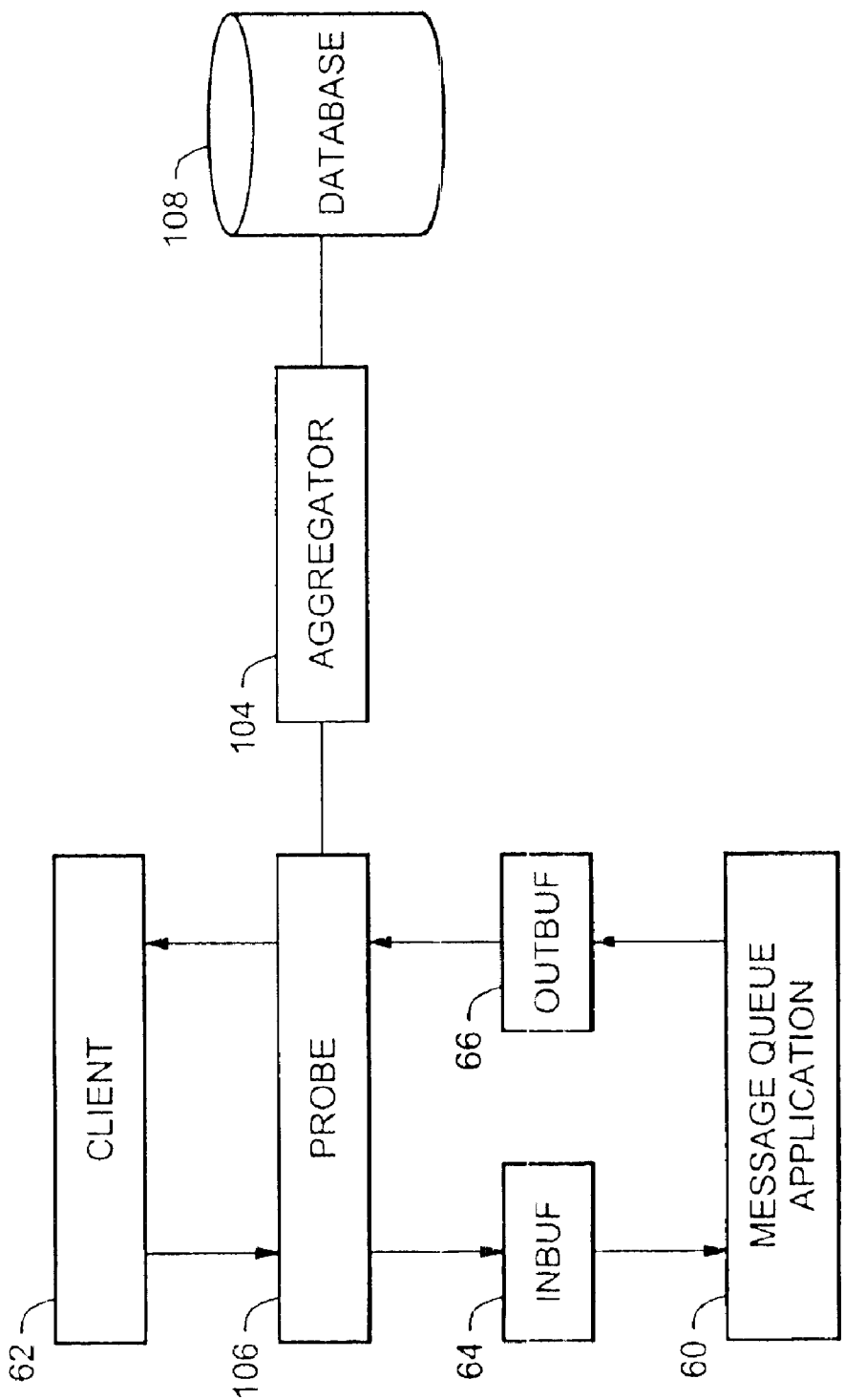
FIG. 6 is a schematic depiction of a probe inserted between a message queue application and a client during teach mode in accordance with the present invention.

FIG. 6 shows further details of a probe 106 for recording data from a message queue application 60 during system teach mode in accordance with the present invention. A message queue client 62 communicates with the message queue application 60 via input and output queues 64,66. The message queue probe 106 is inserted between the client 62 and the queues 64,66 for recording and storing data in the database 108 via the aggregator 104.

Figure 7:
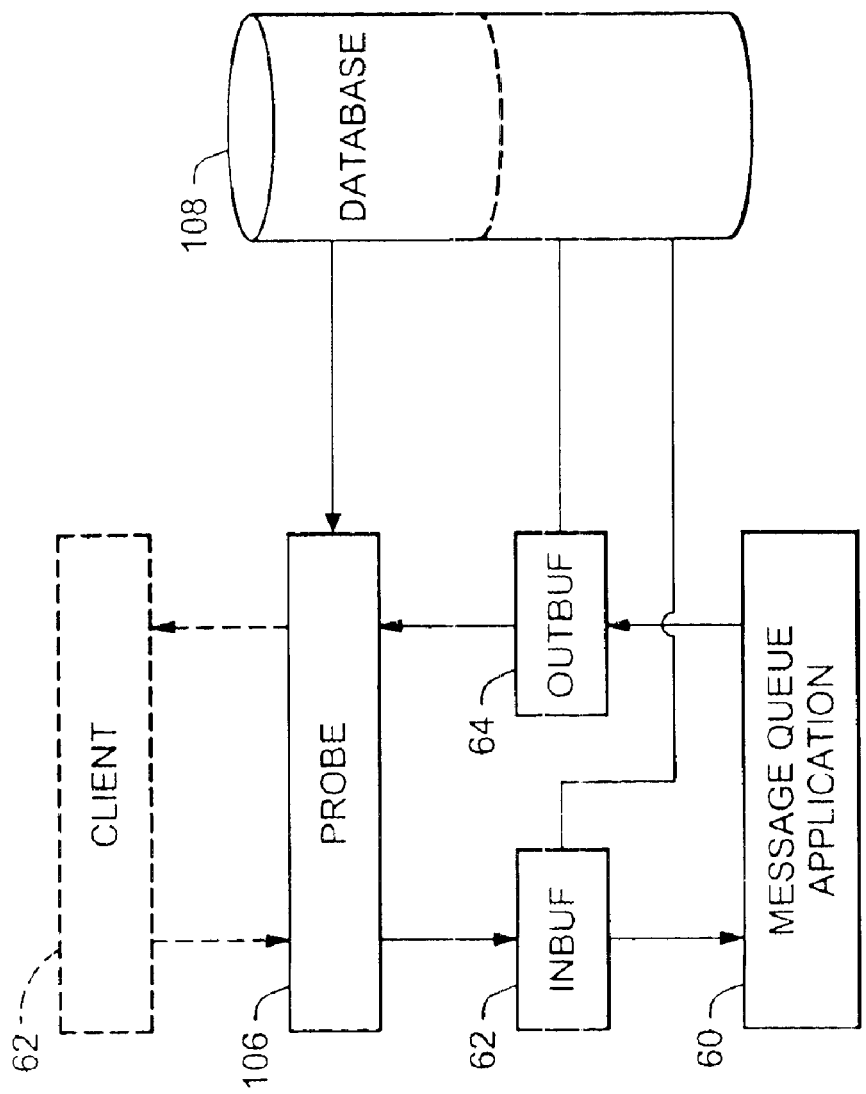
FIG. 7 is a schematic depiction of the probe of FIG. 6 during playback mode in accordance with the present invention.

As shown in FIG. 7, during playback mode, data recorded during teach mode can be injected via the message queue probe 106 to exercise the message queue application 60. During testing, data from the buffers 62,64 can be collected and stored in the database 108 for comparison against expected data.

In a further aspect of the invention, Java reflection is utilized to eliminate the need for code compilation when generating test data for a component under test. In general, reflection can be used to expand data recorded during the teach mode. The expanded data can be used to load test a component, such as an EJB or web page, of an application under test.

As described above, probes can be inserted at various locations in an application under test to record data and methods from components. During teach mode, the probes can record the flow of information associated with the components. During playback mode, the stored data can be used to exercise the probed components while the probes again record information to enable a subsequent comparison of actual and expected data.

In one embodiment, the test system runs in playback mode until reaching a breakpoint previously selected by the user via a web page, for example. The breakpoint can correspond to a web page or an EJB, for example, that the user desires to load test. Running playback mode until reaching the breakpoint sets the proper context for the EJB. From the teach mode, the methods, data, and arguments associated with the EJB are known since they were stored in the database. Reflection is then used to expand the data by a predetermined number, e.g., 500. For example, a spreadsheet can be generated having 500 rows populated with data replicated from the recorded data. To load test the EJB, 500 hundred instances of the EJB are created. The spreadsheet data is provided to the web pages. The number of web pages can be readily increased to determine the maximum load that the system can handle.

Compilation of code is eliminated since the recorded data is retrieved, expanded using reflection, and provided to the Java virtual machine (JVM). As is well known to one of ordinary skill in the art, the JVM is the mechanism that provides hardware and operating system independence. The JVM is an abstract computing machine that recognizes a binary format known as the class file format, which contains JVM instructions.

Since the enterprise system was run during teach mode, the database contains log information identifying beans, methods, data, transactions, and the like. The system can then use the same facility as if code was compiled. At the specified breakpoint, recorded data can be expanded using reflection. The corresponding class file, which contains the expanded data, can then be given to the JVM. By load testing the targeted component with the expanded data, the so-called knee of the curve can be identified. That is, the load test identifies the point at which the system falls apart due to excessive loading.

Figure 8:
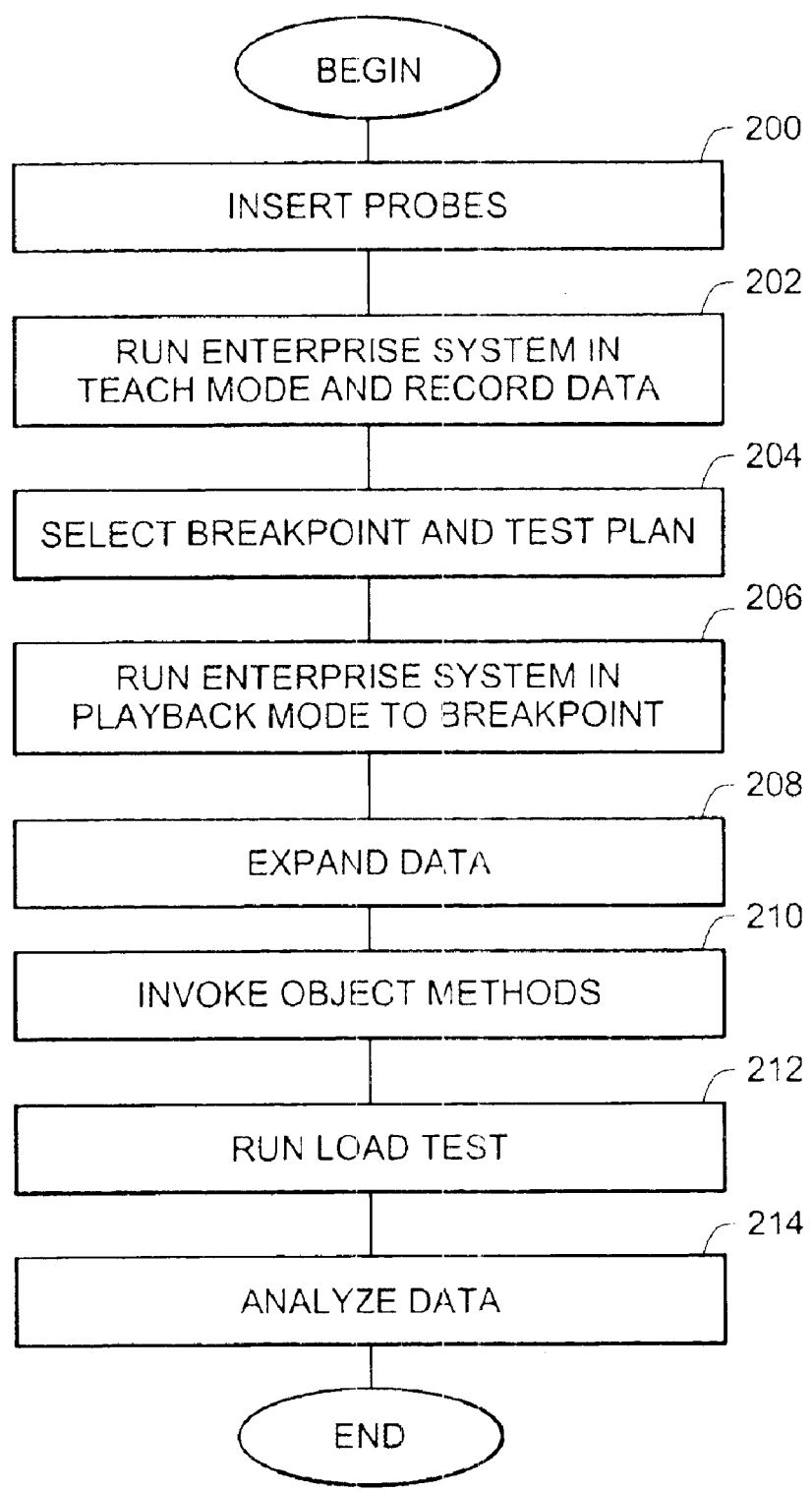
FIG. 8 is a flow diagram showing an exemplary sequence of steps for exercising an application under test using data recorded using probes in accordance with the present invention.

FIG. 8 shows an exemplary sequence of steps for testing an enterprise system component using reflection to eliminate run time compilation for load testing one or more components. In step 200, the user inserts probes into the enterprise system using a graphical interface, such as a website. In step 202, the test system runs in teach mode and records data using the inserted probes located at various locations in the application under test. The user selects a breakpoint and test plan for playback mode in step 204. The breakpoint corresponds to a point right before a targeted component executes. The test plan can contain data including instructions as to which data recordings to use, rules for expanding values, the number of test steps, and rules for analyzing test results.

In step 206, the system runs in playback mode until reaching the breakpoint selected by the user. Reflection is then used to expand data associated with exercising the targeted component of the application under test in step 208. As described above, the database contains all the information associated with the component recorded during teach mode including name, methods, method order, arguments, etc. An object's methods are invoked to run the bean in step 210. In step 212, the test is executed and data is recorded by the probes. When load testing a web page, for example, a predetermined number of instances of the page are created and load tested using a spreadsheet populated with data expanded from the previously recorded data. The actual data is collected and compared to expected data in step 214 for identifying the system breaking point.

The present invention provides an enterprise test system that greatly simplifies testing of enterprise systems by setting the context for a component under test using data recorded from actual transactions. In contrast, known techniques for testing enterprise systems require manual context setup, which can be error prone and time consuming. For example, known testing techniques require a user to manually order the methods called by the component, such as an EJB, under test. One of ordinary skill in the art will appreciate the challenges associated with this task. In addition, the component context may require interactions with other component types, such as a session with a legacy system. Such a session can require manual set up. In contrast, the test system of the present invention automatically sets up the context for the component under test, which greatly simplifies the testing process.

One skilled in the art will appreciate further features and advantages of the invention based on the above-described embodiments. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, the invention is not to be limited by what has been particularly shown and described, except as indicated by the appended claims. All publications and references cited herein are expressly incorporated herein by reference in their entirety.

What is claimed is:

1. A system for testing an enterprise system, comprising:
   an aggregator for interfacing with an application under test that forms a part of an enterprise application system;
   a signal generator/database coupled to the aggregator for storing and retrieving data; and
   a plurality of probes each of which can be inserted between the aggregator and a respective component of the application under test, the plurality of probes for recording component data during a teach mode in the signal generator/database and injecting the data stored in the signal generator/database into the enterprise system during a playback mode to test the components, wherein at least one of the plurality of probes is an Enterprise Java Bean (EJB) software component probe transparently inserted between an EJB software component client and an EJB software component, and wherein a name proxy of the inserted EJB software component probe and the EJB software component are manipulated to transparently insert the EJB software component probe.

2. The system according to claim 1, wherein the aggregator includes a graphical interface for enabling a user to selectively insert the plurality of probes at various locations in the application under test.

3. The system according to claim 2, wherein the graphical interface includes a mechanism for selecting a breakpoint for playback mode.

4. The system according to claim 1, wherein the plurality of probes includes probes for interfacing to components selected from the group consisting of databases, networks, message queues, servlets, Enterprise JAVA Beans (EJB) software components, legacy systems, and web servers.

5. The system according to claim 1, wherein the signal generator/database can store component data selected from the group consisting of bean names, methods, arguments, method ordering, transaction number, elapsed time, and object information.

6. The system according to claim 1, wherein the aggregator includes a graphical interface having a mechanism to expand data associated with a component under test.

7. The system according to claim 6, wherein the graphical interface further includes a mechanism to create a plurality of instances of the component under test and exercise the component under test using data expanded from the data stored in the signal generator/database.

8. A method for testing an enterprise system, comprising:
   inserting a plurality of probes between an aggregator and respective components of an application under test;
   recording data received by the plurality of probes during a teach mode;
   storing the recorded data in a database;
   injecting the recorded data into the enterprise system during a playback mode;
   recording data received by the plurality of probes during the playback mode;
   comparing actual and expected data;
   transparently inserting an (EJB) software component probe as one of the plurality of probes between an EJB software component client and an EJB software component by replacing a name proxy of the EJB software component with that of the EJB software component probes.

9. The method according to claim 8, further including selecting a breakpoint corresponding to a point associated with a component under test.

10. The method according to claim 9, further including running the application under test until reaching the breakpoint and retrieving recorded data associated with the component under test.

11. The method according to claim 10, further including expanding the data associated with the component under test and creating a plurality of instances of the component under test.

12. The method according to claim 11, further including load testing the component under test with the expanded data.

13. The method according to claim 12, further including load testing the component under test without compiling test code.

14. The method according to claim 9, further including selecting the component under test from the group consisting of EJB software components, web pages, web queues, databases, legacy systems, and message queues.

15. The method according to claim 8, further including testing at least one of the plurality of components in a transactional context.

16. The method according to claim 15, further including retrieving methods associated with the at least one of the plurality of components in an order in which the methods were called during the teach mode.

17. The method according to claim 8, further including using JAVA reflection to generate the EJB software component probe from the EJB software component.

18. The method according to claim 10, further including extracting execution time associated with the plurality of probes.

19. A computer readable medium having computer readable code thereon, the medium comprising:

instructions for inserting a plurality of probes between an aggregator and respective components of an application under test;

instructions for recording data received by the plurality of probes during a teach mode;

instructions for storing the recorded data in a database;

instructions for injecting the recorded data into the enterprise system during a playback mode;

instructions for recording data received by the plurality of probes during the playback mode;

instructions for comparing actual and expected data; and instructions for transparently inserting an EJB software component probe as one of the plurality of probes between an EJB software component client and an EJB software component by replacing a proxy of the EJB software component with that of the EJB software component probe.

20. The computer readable medium according to claim 19, further including instructions for selecting a breakpoint corresponding to a point associated with a component under test.

21. The computer readable medium according to claim 20, further including instructions for running the application under test until reaching the breakpoint and retrieving recorded data associated with the component under test.

22. The computer readable medium according to claim 21, further including instructions for expanding the data associated with the component under test and creating a plurality of instances of the component under test.

23. The computer readable medium product according to claim 22, further including instructions for load testing the component under test with the expanded data.

24. The computer readable medium according to claim 19, further including instructions for selecting the component under test from the group consisting of EJB software components, web pages, web pages, web queues, databases, legacy systems, and message queues.

25. The computer readable medium according to claim 19, further including instructions for load testing the component under test without compiling test code.

26. The computer readable medium according to claim 19, further including instructions for testing at least one of the plurality of components in transactional context.

27. The computer readable medium according to claim 26, further including instructions for retrieving methods associated with the at least one of the plurality of components in an order in which the method were called during the teach mode.

28. The computer readable medium according to claim 19, further including instructions for using JAVA programming language reflection to generate the EJB software component probe from EJB software component.

29. The computer readable medium according to claim 19, further including instructions for extracting execution time associated with plurality of probes.

* * * * *

UNITED STATES PATENT AND TRADEMARK OFFICE
CERTIFICATE OF CORRECTION

PATENT NO. : 6,865,692 B2
DATED : March 8, 2005
INVENTOR(S) : George E. Friedman and Michael V. Glik It is certified that error appears in the above-identified patent and that said Letters Patent is hereby corrected as shown below:

Title page,
Item [74], *Attorney, Agent, or Firm*— "Chaptin & Huang, L.L.C." should read
-- Chapin & Huang, L.L.C. --.

Column 10,
Line 48, "(EJB)" should read -- EJB --.
Line 53, "probes" should read -- probe --.

Column 12,
Line 19, "web pages, web pages" should read -- web pages --.

Signed and Sealed this

Thirty-first Day of May, 2005

JON W. DUDAS
*Director of the United States Patent and Trademark Office*